US009941598B2

(12) United States Patent
Suh et al.

(10) Patent No.: US 9,941,598 B2
(45) Date of Patent: Apr. 10, 2018

(54) IN-BAND FULL-DUPLEX COMPLEMENTARY ANTENNA

(71) Applicant: Intel Corporation, Santa Clara, CA (US)

(72) Inventors: Seong-Youp John Suh, Portland, OR (US); Tae Young Yang, Hillsboro, OR (US); Yang-Seok Choi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 170 days.

(21) Appl. No.: 14/871,975

(22) Filed: Sep. 30, 2015

(65) Prior Publication Data

US 2017/0093050 A1 Mar. 30, 2017

(51) Int. Cl.
| | |
|---|---|
| *H01Q 21/28* | (2006.01) |
| *H04Q 9/16* | (2006.01) |
| *H01Q 13/10* | (2006.01) |
| *H04B 1/56* | (2006.01) |
| *H04B 1/54* | (2006.01) |
| *H04L 5/14* | (2006.01) |
| *H01Q 9/16* | (2006.01) |

(52) U.S. Cl.
CPC ............ *H01Q 21/28* (2013.01); *H01Q 9/16* (2013.01); *H01Q 13/10* (2013.01); *H04B 1/54* (2013.01); *H04B 1/56* (2013.01); *H04L 5/14* (2013.01)

(58) Field of Classification Search
CPC .. H04L 5/14; H04B 1/525; H04B 1/54; H04B 1/10; H01Q 1/525; H01Q 21/24
See application file for complete search history.

(56) References Cited

U.S. PATENT DOCUMENTS

| | | | |
|---|---|---|---|
| 6,559,809 B1 * | 5/2003 | Mohammadian | H01Q 1/243 343/702 |
| 9,070,985 B2 * | 6/2015 | Wang | H01Q 1/243 |
| 2003/0210194 A1 * | 11/2003 | Gilmore | H01Q 1/22 343/725 |
| 2008/0231522 A1 | 9/2008 | Montgomery et al. | |
| 2008/0238804 A1 | 10/2008 | Suh et al. | |
| 2012/0147790 A1 | 6/2012 | Khojastepour et al. | |
| 2012/0188917 A1 | 7/2012 | Knox | |

(Continued)

FOREIGN PATENT DOCUMENTS

JP 2008-306611 A 12/2008

OTHER PUBLICATIONS

T. Dinc, H. Krishnaswamy, A T/R Antenna Pair with Polarization-Based Reconfigurable Wideband Self-Interference Cancellation for Simultaneous Transmit and Receive, 2015 IEEE MTT-S International Microwave Symposium (IMS), May 22, 2015, pp. 1-4.*

(Continued)

*Primary Examiner* — Christopher Crutchfield
(74) *Attorney, Agent, or Firm* — Schiff Hardin LLP

(57) ABSTRACT

Described herein are technologies related to an in-band full-duplex wireless communication operation. More particularly, the technologies utilize a complementary pair of antennas for signal transmission and reception arranged in a new manner to be both compact (relatively to conventional approaches) and provide an extremely high (e.g., 60 dB or more) isolation.

24 Claims, 5 Drawing Sheets

(56) References Cited

U.S. PATENT DOCUMENTS

2013/0223294 A1   8/2013   Karjalainen et al.
2013/0343235 A1   12/2013  Khan

OTHER PUBLICATIONS

B. Debaillie, J. van den Broek, C. Lavin, B. van Liempd, E. Klumperink, C. Palacios, J. Craninckx, B. Nauta, A. Parssinen, Analog/RF Solutions Enabling Compact Full-Duplex Radios, IEEE Journal on Selected Areas in Communications, vol. 32, No. 9, pp. 1662-1673, Sep. 2014.*
A., Khandani, Two-way (true full-duplex) wireless, 2013 13th Canadian Workshop on Information Theory, Jun. 21, 2013, pp. 1-10.*
E. Everette, Full-duplex Infrastructure Nodes: Achieving Long Range with Half-duplex Mobiles, Master's Thesis, Apr. 2012, pp. 1-88.*
Ashutosh Sabharwal, Philip Schniter, Dongning Guo, Daniel W. Bliss, Sampath Rangarajan, and Risto Wichman, In-Band Full-Duplex Wireless: Challenges and Opportunities, IEEE J. Sel. Areas. Commun., vol. 32, pp. 1637-1652, 2014.*
Choi, et al., "Simultaneous Transmission and Reception: Algorithm, Design and System Level Performance", Computer Science, Networking and Internet Architecture, vol. 12, No. 12, Dec. 2013, 1 page.
Oh, et al., "Dual Polarization Slot Antenna With High Cross Polarization Discrimination for Indoor Small Cell MIMO Systems", Antennas and Wireless Propagation Letters, IEEE, vol. 14, 2015, 1 page.
Zhou, et al., "Recent Developments in Fully Integrated RF Self Interference Cancellation for Frequency Division and Full Duplex Radios", 81st Vehicular Technology Conference (VTC Spring), IEEE, 2015, 1 page.
International Search Report and Written Opinion received for PCT Application No. PCT/US2016/048148, dated Oct. 28, 2016, 11 pages.
Sabharwal et al.,"In-Band Full-Duplex Wireless: Challenges and Opportunities", IEEE Journal on Selected Areas in Communications, vol. 32, No. 9, Sep. 2014, pp. 1637-1652.

\* cited by examiner

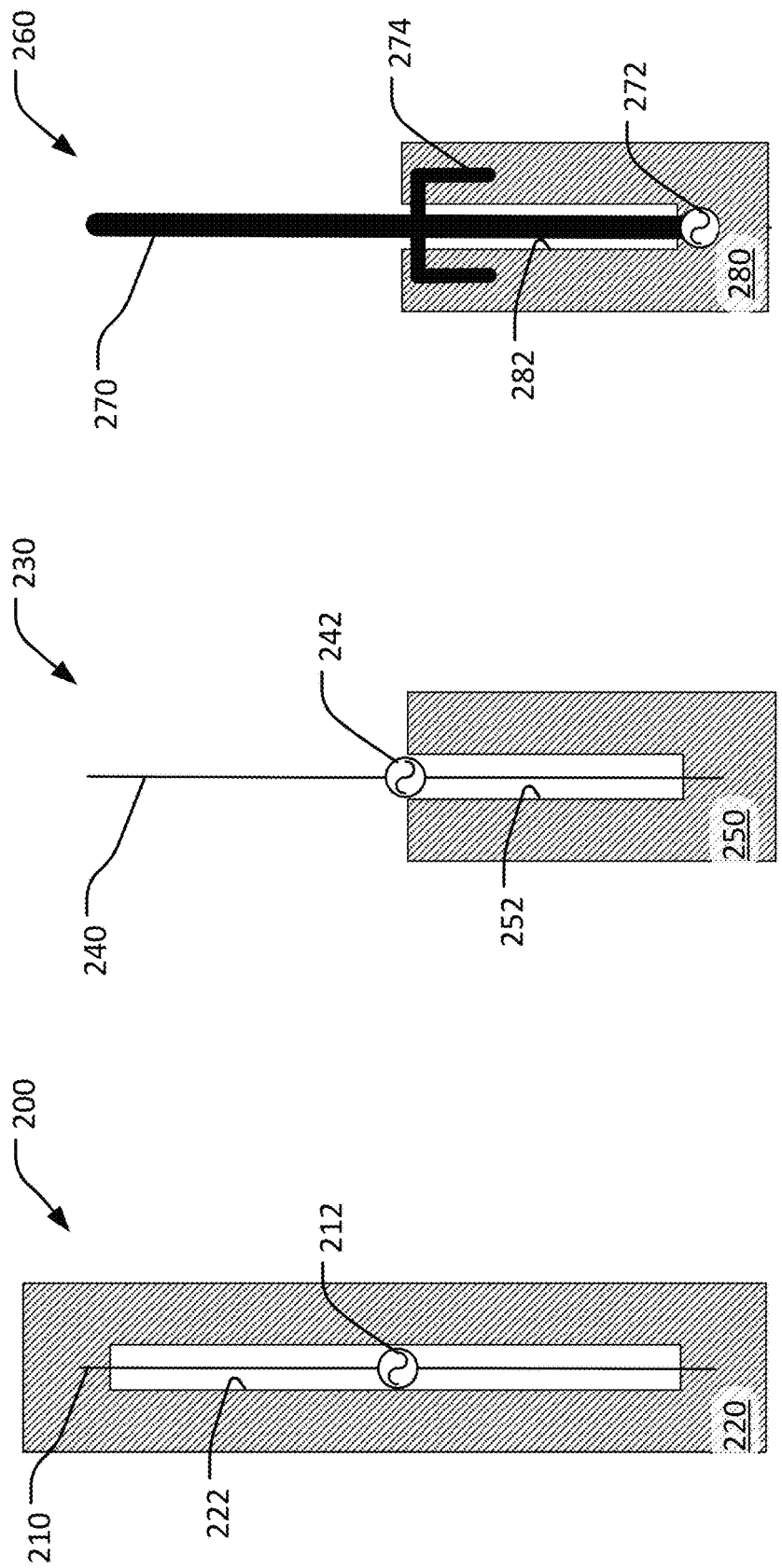

IN-BAND FULL-DUPLEX COMPLEMENTARY ANTENNA

BACKGROUND

The next generation of wireless (e.g., cellular) communication technology standards improve over the previous generation's data throughput. It is expected that the so-called fifth generation (5G) wireless communication systems and networks will dramatically (e.g., about twice as much) increase the data throughput of the previous generation.

Existing wireless communication systems and networks (including current generations) employ duplexing. Namely, either frequency division duplex (FDD) or time division duplex (TDD) has been used for separate transmission and reception. In FDD and TDD, transmitted signal does not interfere with received signal due to a separate use of frequency and time resources respectively. Therefore twice the amount of frequency and/or time are used in current duplexing systems compared to in-band full-duplex systems (IBFD). It seems possible to double data throughputs by simultaneous transmission and reception in the same frequency band at the same time.

In-band full-duplex (IBFD) operation has emerged as an attractive solution to increase the data throughput of wireless communication systems and networks. With IBFD, a wireless device (i.e., node) transmits and receives simultaneously in the same or common frequency band. However, one the biggest practical impediments to IBFD operation is the presence of self-interference (i.e., the interference caused by an IBFD node's own transmissions to its desired receptions).

The self-interference impediment to IBFD operation has been addressed by several conventional antenna designs. For example, one conventional approach is called echo cancellation. In this approach, a single antenna is used for both transmission and reception. That antenna is connected to a circulator. The circulator interconnects three different elements: antenna, transmitting (TX) radio frequency (RF) subsystem, and receiving (RX) RF subsystem.

While this arrangement accomplishes the IBFD operation, there is a signal leakage from the TX RF subsystem to the RX RF subsystem due to a relatively low isolation level (e.g., ~20 dB) between the TX and RX port in the circulator. In addition to the TX signal leakage, the TX signal is reflected due to impedance mismatch at the antenna port. This reflection may dominate the desired RX signal at the RX RF subsystem. Furthermore, as wireless commination components go, a circulator is relatively large and heavy because of its magnets.

Another conventional approach utilizes two separate antennas. The antenna pairs have a high isolation level (e.g., ~40 dB) with a relatively large separation and each antenna is dedicated to either signal transmission (TX) or reception (RX). While this dual-antenna approach eliminates the heavy and large circulator, it introduces new problems. The primary problems of this dual-antenna approach are space and complexity. Two separate and isolated antennas require more space because there are twice as many antennas and those antenna must be physically spaced from each other sufficiently enough to reduce interference therebetween.

BRIEF DESCRIPTION OF THE DRAWINGS

FIGS. 2A-2C illustrate examples of complementary antenna pairs in accordance with implementations described herein.

The Detailed Description references the accompanying figures. In the figures, the left-most digit(s) of a reference number identifies the figure in which the reference number first appears. The same numbers are used throughout the drawings to reference like features and components.

DETAILED DESCRIPTION

Described herein are technologies to facilitate in-band full-duplex wireless communication operation. More particularly, the technologies utilize a complementary pair of antenna for signal transmission and reception arranged in a new manner to be both compact (relatively to conventional approaches) and provide an extremely high (e.g., 60 dB or more) isolation. The reduced size and extremely high isolation of the described technology are likely to be attractive to those implementing the next generation (e.g., 5G) of wireless (e.g., cellular) communication standards.

The technologies described herein have co-located transmission (TX) and reception (RX) antennas and achieves an extremely high (e.g., 60 dB or more) isolation level between the TX radio-frequency (RF) subsystem and the RX RF subsystem. In contrast to conventional echo-cancellation approach, the technologies described herein do not use a circulator.

Example Wireless Communication Scenario

Figure 1:
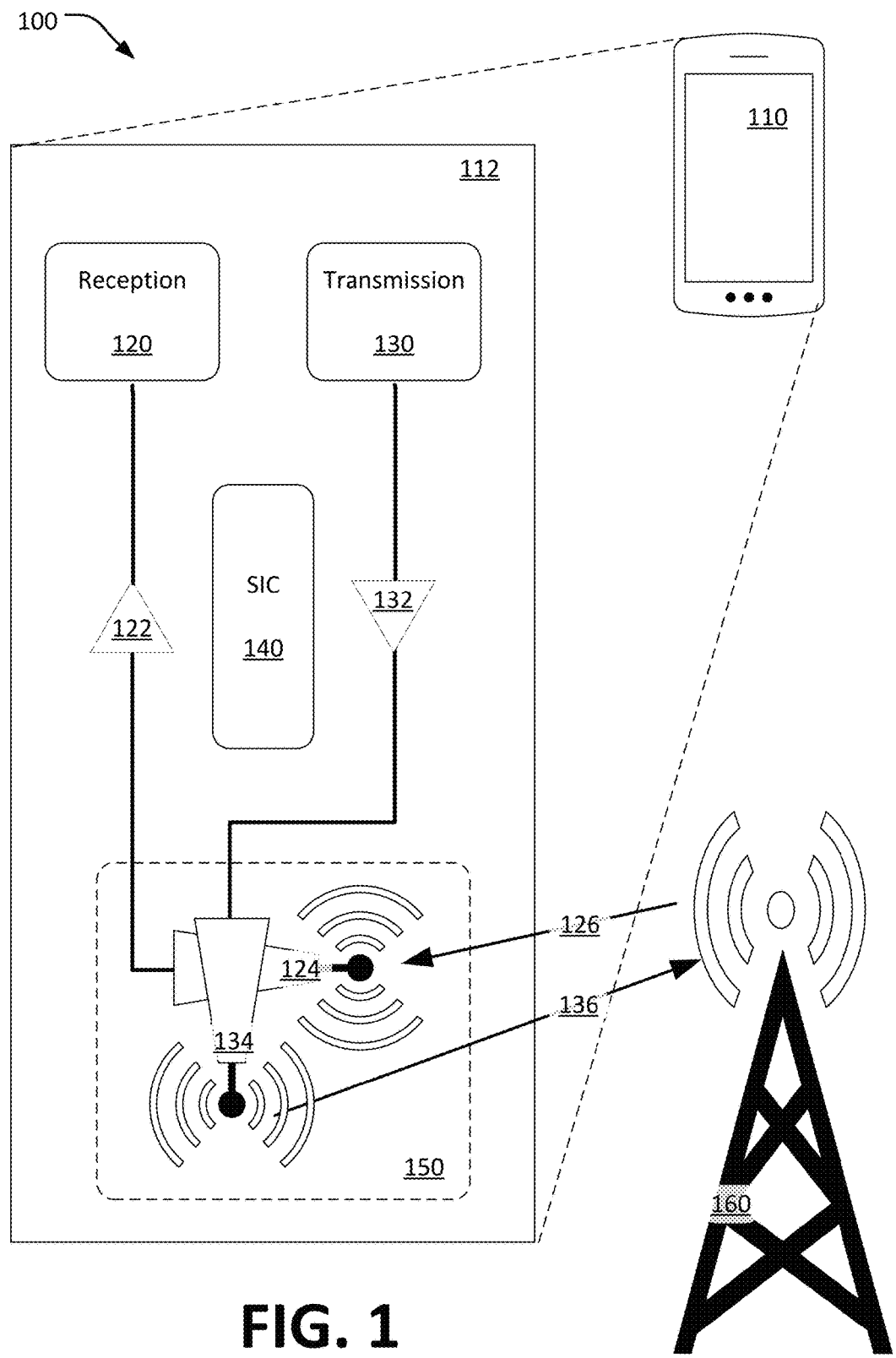
FIG. 1 illustrates an example scenario of a mobile device in accordance with implementations described herein.

FIG. 1 shows an example wireless communication scenario 100 that utilizes an implementation of the in-band full-duplex (IBFD) complementary antenna, as described herein. As depicted, the example scenario 100 includes a mobile device 110 (such as a cellular phone, smartphone, tablet computer, etc.) as part of a wireless communication system or network, which is represented by a wireless tower 160. Even though the example scenario 100 shows the IBFD in a mobile device 110, the IBFD antenna solution can also be implemented on the wireless tower 160 or else wherein a wireless communication network.

Box 112 contains the relevant internal operating components of the wireless communication system of the mobile device 110. For the sake of illustration, the box 112 does not show all components of the mobile device 110 and all of the connection therebetween.

The depicted components include a reception subsystem and a transmission subsystem. The reception subsystem includes reception circuitry 120, low-noise amplifier (LNA) 122, and reception antenna 124. The reception antenna 124 is shown receiving an incoming signal 126 from the wireless tower 160. The transmission subsystem includes transmission circuitry 130, power amplifier (PA) 132, and transmission antenna 134. The transmission antenna 134 is shown transmitting an outgoing signal 136 to the wireless tower 160.

Considered separately and independently, each of the transmission and reception subsystems (and their components) utilizes known techniques to accomplish their function. For example, receiving circuitry 120 employs known mechanisms (e.g., hardware, circuits, firmware, software (in cooperation with hardware), etc.) to accomplish reception of incoming wireless signals. LNA 122 is a known electronic amplifier used to amplify very weak signals (for example, signals captured by an antenna).

Note that each antenna is part of only one of the subsystems. That is, each antenna is dedicated to either transmission or reception, but not both. Also, these subsystems are designed to be operated in in-band full-duplex mode. That is, each subsystem is configured to simultaneously operate (e.g., transmit or receive) within a common frequency band with the other subsystem. Because of this, the reception subsystem is prone to self-interference from the transmitting subsystem. Of course, self-interference amelioration is one of the features of one or more of the implementation of the in-band full-duplex (IBFD) complementary antenna, as described herein.

A self-interference cancellation (SIC) circuitry 140 is also shown as another internal component of the mobile device 110 in box 112. The SIC circuitry 140 employs known mechanisms (e.g., hardware, circuits, firmware, software (in cooperation with hardware), etc.) to accomplish a cancellation of self-interference caused by the large power differential between the mobile device's 110 own transmission and the signal of interest that originates from a distant node (e.g., cellular tower 160). The large power differential is simply because the self-interference signal has to travel much shorter distances compared to the signal of interest. As a result of the large power differential, the signal of interest is swamped by the self-interference most especially in the digital baseband due to finite resolution of analog-to-digital conversion.

As depicted, a dashed box 150 encloses both the reception antenna 124 and transmission antenna 134. Collectively, these antenna represent IBFD complementary antenna, which is an example of the subject technology described herein. When referenced as the complementary antenna 150 rather than the separate transmission and reception antennas (134, 124) respectively, the complementary antenna 150 is not considered to be part of either of the transmission or reception subsystems.

As depicted, each of the antennas of the complementary antenna 150 is shown arranged in an orthogonal manner relative to each other. This depiction primarily indicates the electrical arrangement of the antennas and not their physical arrangement. Each of the antennas radiate linearly in orthogonal (i.e., perpendicular) directions relative to each other.

In some instances, the antennas are described as radiating with linear polarization in a substantially orthogonally from each other. Herein, the term "substantial" when applied to orthogonal (or the like) allows for plus/minus one degree from true or perfect orthogonal (i.e., perpendicular). Similarly, the term "near true" when applied to orthogonal (or the like) allows for plus/minus half a degree from true or perfect orthogonal.

As depicted in FIG. 1, the complementary antenna 150 includes two linearly polarized antennas: separate transmission and reception antennas (134, 124). Generally, an antenna is a transducer that converts radio frequency electric current to electromagnetic waves that are then radiated into free space. The electric field determines the polarization or orientation of the radio wave. In general, most antennas radiate either linear or circular polarization.

The antennas (134, 124) of the complementary antenna 150 form a dual orthogonal linearly polarized antennas. This means that, relative to each other or to an outside reference, one of the antennas is vertically polarized and the other is horizontally polarized.

FIGS. 2A-C show several examples of complementary antenna in accordance with the technology described herein. Each example includes a pair of co-located complimentary, but different types, of antennas. Namely, the pair includes dipole and slot antenna elements placed together. The complementary antenna pair provide orthogonal antenna polarization, but in a co-located antenna structure.

FIG. 2A shows a complementary dipole-and-slot pair 200 of antennas. With this, a center-fed dipole antenna 210 is co-located with a full-size and half-wavelength planar slot antenna 220. As shown, the dipole antenna 210 is located within a slot 222 of the slot antenna 220 and the dipole feed 212 is also located within the slot.

In general, a slot antenna consists of a metal surface (e.g., a flat plate) with a hole or slot therein. Since this is a half-wavelength slot antenna, its feed (not shown) is located at the center of slot 222.

In general, a dipole antenna includes two identical conductive elements such as metal wires or rods, which are usually bilaterally symmetrical. The driving voltage from a transmitter is applied (or for receiving antennas the output signal to the receiver is taken) between the two halves of the antenna. Typically, each side of the feedline to the transmitter or receiver is connected to one of the conductors. This contrasts with a monopole antenna, which consists of a single rod or conductor with one side of the feedline connected to it, and the other side connected to some type of ground.

FIG. 2B shows a half-size slot antenna 250 paired with a center-fed dipole antenna 240 (like that shown in FIG. 2A). With this, the center-fed dipole antenna 240 is co-located with the half-size and quarter-wavelength planar slot antenna 250. As shown, the dipole antenna 240 is located, at least partially, within a slot 252 of the slot antenna 250 and the dipole feed 242 is also located, at least partially, within the slot. Note that at least a portion of the dipole antenna extends outside of the slot.

FIG. 2C shows a half-size slot antenna 280 combined with a sleeve dipole antenna 270. With this, the end-fed sleeve dipole antenna 270 is co-located with the half-size and quarter-wavelength planar slot antenna 280. As shown, the sleeve dipole antenna 270 is located, at least partially, within a slot 282 of the slot antenna 280 and the dipole feed 272 is also located in or near the slot. The sleeve dipole antenna 270 has an integrated balun 274. Note that at least a portion of the sleeve dipole antenna extends outside of the slot.

Generally, a sleeve dipole antenna is a dipole antenna with a feed (e.g., transmission or reception line) entering from one end of an antenna element. A balun is an antenna element that balances currents on the antenna feed. Otherwise, currents can flow on a feed cable or a metallic part of platform. These unbalanced currents not only distort the radiation pattern of the antenna, but also reduce radiation efficiency.

The example antenna pairs shown in FIGS. 2A-2C provide a very high isolation level (e.g., 60 dB or more) between antenna elements even though the antenna elements of each antenna are co-located because of the nature of the complementary antenna pairs with orthogonal polarizations. Some implementations achieve an isolation at 65 dB or higher. Therefore, electrical and magnetic fields from the antenna elements are decoupled, which gives the very high isolation level between the elements.

The complementary antenna are described as co-located. In one or more implementations, this means that the antennas are located within the boundaries of a common "real estate" (i.e., two-dimensional space or x-y directions) of the circuitry or circuit board of a wireless device (e.g., the mobile device 110). The two different antennas are co-located. In this way, the dipole antenna is located, at least partially, within the boundaries of one or more slots of the slot antenna.

Figure 3B:
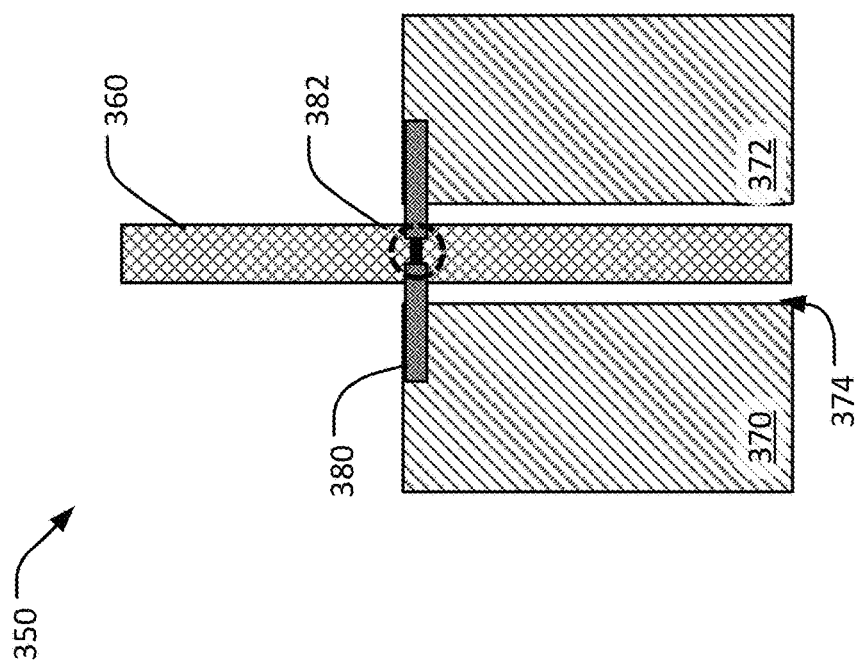
FIGS. 3A-B illustrate examples of complementary antenna pairs in accordance with implementations described herein.
Figure 3A:
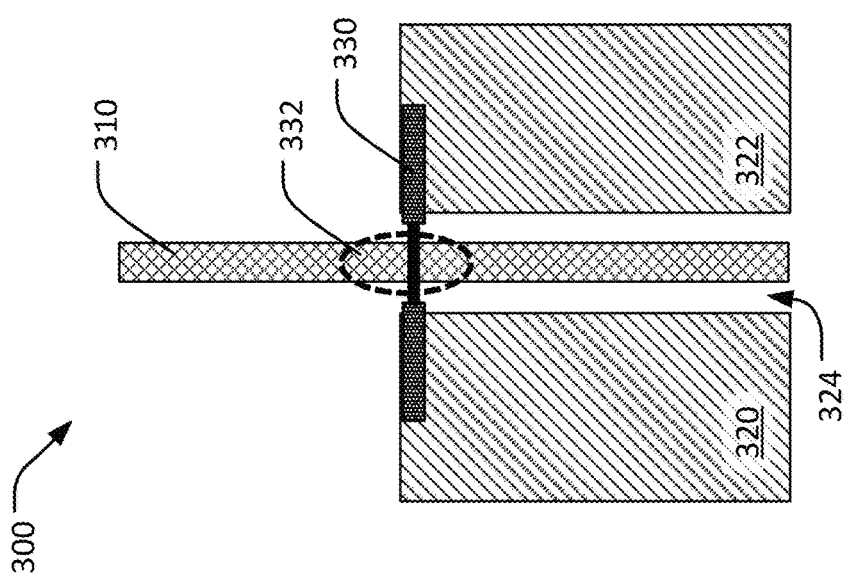

FIGS. 3A and 3B show two example antenna systems 300, 350 that include an IBFD complementary linearly polarized antenna pair. For illustration purposes, both examples 300, 350 are shown in a simplified manner. For example, the substrate on which the antenna elements are attached is not shown. Similarly, most of the connecting links are not shown.

FIG. 3A shows the example antenna system 300, which is lower-isolation implementation of the IBFD complementary antenna pair as described herein. The example antenna system 300 includes a sleeve dipole antenna element 310, slot antenna elements 320, 322 with its slot 324, a coaxial cable 330 for slot feed, and exposed coax conductor 332 of the coaxial cable. The exposed coax conductor 332 is circled by a dashed line in FIG. 3A.

For this example antenna system 300, the exposed coax conductor 332 is one millimeter or greater in some implementations. In other implementations, the length of the exposed coax conductor is greater than the width of the slot that it spans. In still other implementations, the length of the exposed coax conductor is greater than the width of the sleeve dipole antenna element over which it bridges.

In some implementations of the sleeve dipole antenna element 310 microstrip is utilized. Microstrip is a type of electrical transmission line which can be fabricated using printed circuit board (PCB) technology. It consists of a conducting strip separated from a ground plane by a dielectric layer known as the substrate. In some other implementations, other solutions may be utilized, such as striplines and coplanar waveguides.

In some implementations, the coaxial cable feed 330 and antenna structures (e.g., 310, 320, 322) are constructed with planar metal strips printed on a multiple layer printed circuit board (PCB).

FIG. 3B shows the example antenna system 350, which is higher-isolation implementation of the IBFD complementary antenna pair as described herein. The example antenna system 350 includes a sleeve dipole antenna element 360, slot antenna elements 370, 372 with its slot 374, a coaxial cable 380 for slot feed, and exposed coax conductor 382 of the coaxial cable. The exposed coax conductor 382 is circled by a dashed line in FIG. 3B.

For this example antenna system 350, the exposed coax conductor 382 is less than one millimeter in some implementations. In other implementations, the length of the exposed coax conductor is less than the width of the slot that it spans. In still other implementations, the length of the exposed coax conductor is less than the width of the sleeve dipole antenna element over which it bridges.

There are both vertical and horizontal components exist in each antenna current. Because the vertical currents on the edges of the sleeve dipole antenna element 310, 360 (e.g., microstrip structure) are dominant, the horizontal currents (or magnetic fields) are often ignored. However, the horizontal currents can get coupled with the currents on the center conductor 332, 382 of slot coax feed 330, 380.

In order to maximize the isolation and achieve a very high level (e.g., greater than 60 dB) of isolation between the slot and sleeve-dipole antenna, the coupling between the horizontal currents of sleeve dipole antenna element 310, 360 and the currents of the exposed center conductor 332, 382 of slot coax feed 330, 380 should be minimized.

There is a direct correlation between the length of the exposed center conductor 332, 382 of slot coax feed 330, 380 and the coupling (e.g., interactions) between the electrical fields of one antenna with the other. Consequently, minimizing the length of the exposed center conductor 332, 382 enhances the isolation between the complementary antenna pair.

Consequently, the exposed coax conductor 382 is less than one millimeter in some implementations to achieve a very high level (e.g., greater than 60 dB) of isolation. In other implementations, the length of the exposed coax conductor is less than the width of the slot that it spans. In still other implementations, the length of the exposed coax conductor is less than the width of the sleeve dipole antenna element over which it bridges.

Figure 4B:
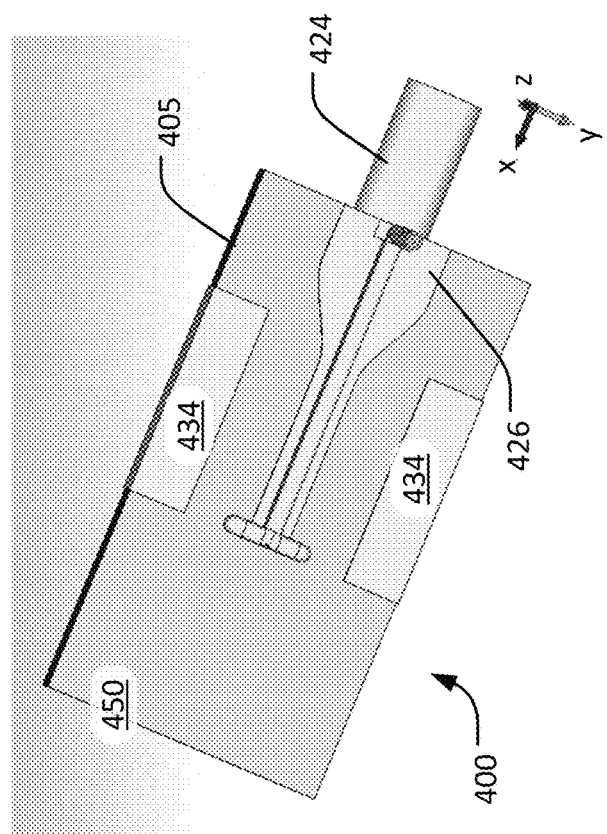
FIGS. 4A-B illustrate an example of a complementary antenna pair in accordance with implementations described herein.
Figure 4A:
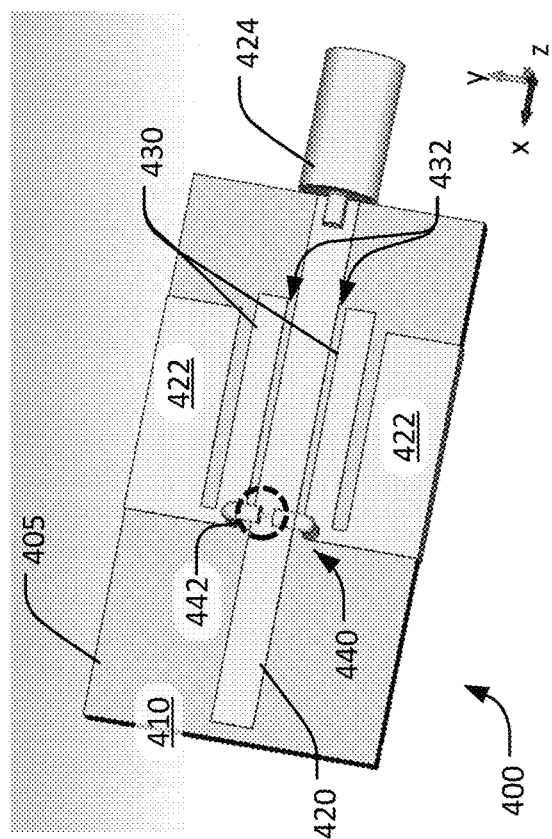

FIGS. 4A and 4B illustrate opposite sides of an example complementary antenna structure 400, which is constructed in accordance with one or more implementations described herein. FIG. 4A shows a first side 410 (nominally, "front" side) of the example complementary antenna structure 400. FIG. 4B shows a second and the opposite side 450 (nominally, "back" side) of the example complementary antenna structure 400.

As depicted, the example complementary antenna structure 400 has an antenna element 420 of a sleeve dipole antenna on the front side 410 of the substrate 405. The dipole element 420 extends between and through a pair of elements 430 that act as the slot antennas and define the slot 432 therebetween.

Antenna elements 422 on the front side 410 of the substrate 405 act as sleeves and/or baluns for the sleeve dipole antenna and also act as the ground plane for the slot antenna. The coax feed 424 for the sleeve dipole antenna attaches at one end of the substrate 405 and can be seen from both sides of that substrate.

A coax feed 440 is shown on the front side 410 of the substrate 405. In particular, it is shown emerging from the substrate and bridging over the dipole element 420 in the slot 432. FIG. 4A shows an exposed center conductor 442 of the feed 440 and it highlighted by a dashed line circle thereabout it.

The back side 450 of the substrate 405 has grounds for the antennas. In particular, elements 434 are the folded grounds for the slot antenna and element 426 is the ground for the sleeve dipole antenna.

Figure 5B:
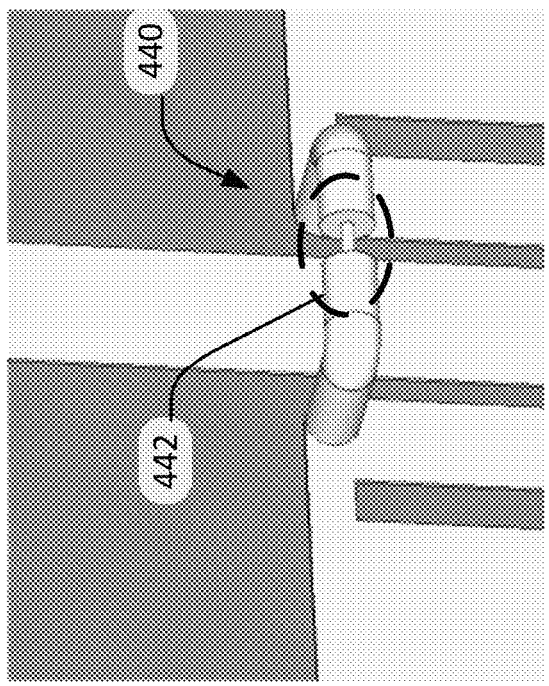
FIGS. 5A-5B illustrate a portion of an example of a complementary antenna pair in accordance with implementations described herein.
Figure 5A:
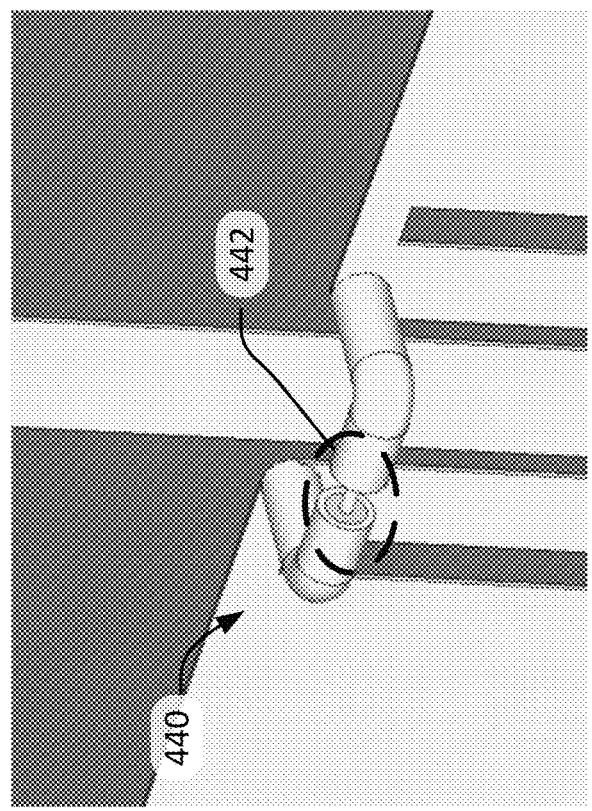

FIGS. 5A and 5B show, from differing angles, an enlarged view of the coax feed 440 of the example complementary antenna structure 400. These figures also show the exposed center conductor 442 from differing angles. The coax feed 440 is configured to avoid coupling or shorting between the differing antennas. Generally, the width of the sleeve dipole element (e.g., 420) is greater than the length of the exposed center conductor 442.

In addition, because each antenna element can be connected to either the TX or RX subsystems, a circulator is not needed. In one or more implementations, one antenna element (e.g., slot antenna) can be printed on thin antenna substrate with the other antenna element can be printed on the other side of the substrate. One or more implementations may be employed with conventional and new wireless protocols and most (if not all) frequency bands for long-term evolution (LTE), Bluetooth (BT), IEEE 801.11x (WiFi), multiple-input and multiple-output (MIMO), and the so-called 5G communication protocols.

In some implementations, the elements of the antennas are co-located with only a 0.1 mm gap therebetween the elements of the different antennas. The antennas can be packaged into a single antenna structure with two feeds. In some implementations of the antenna elements described herein may constructed with microstrip, striplines and/or coplanar waveguides.

The arrangement of the dipole antenna relative to the slot antenna can vary by the implementation. For example, the dipole antenna can be on top/below of the slot antenna immediately over/under the slot. Furthermore, the dipole antenna can also be on the same plane with the slot antenna within the width of the slot.

Implementations may utilize different types of slot antennas. Examples of suitable slot antennas include half-wavelength antenna, quarter-wavelength antenna, electrically-small antenna, impedance-loaded antenna, and material-loaded antenna.

While the implementations described herein reference use with part of a mobile device (such as a phone, cellular phone, smartphone, tablet computer, etc.), other implementations may be utilized in different types of wireless devices, such as a base station, access point, repeater, and backhaul, wireless tower, and the like. Herein, references to a wireless device includes all such devices that are commonly used in a wireless communication network (e.g., WiFi, cellular, etc.) Also, herein, references to a portable wireless device includes portable or mobile devices witch interact or are part of that wireless communication network.

Of course, the implementations described herein focused on combining dipole and an inverse slot antenna. Other implementations may employ other types and combinations of antenna as long as they operate linearly orthogonal relative to each other.

In the above description of example implementations, for purposes of explanation, specific numbers, materials configurations, and other details are set forth in order to better explain the present invention, as claimed. However, it will be apparent to one skilled in the art that the claimed invention may be practiced using different details than the example ones described herein. In other instances, well-known features are omitted or simplified to clarify the description of the example implementations.

The inventors intend the described example implementations to be primarily examples. The inventors do not intend these example implementations to limit the scope of the appended claims. Rather, the inventors have contemplated that the claimed invention might also be embodied and implemented in other ways, in conjunction with other present or future technologies.

Moreover, the word "example" is used herein to mean serving as an example, instance, or illustration. Any aspect or design described herein as "example" is not necessarily to be construed as preferred or advantageous over other aspects or designs. Rather, use of the word example is intended to present concepts and techniques in a concrete fashion. The term "techniques," for instance, may refer to one or more devices, apparatuses, systems, methods, articles of manufacture, and/or computer-readable instructions as indicated by the context described herein.

The following examples pertain to further embodiments:

Example 1 is an in-band full-duplex (IBFD) antenna system comprising: a linearly polarized transmission antenna functionally coupled to a wireless transmission subsystem of a wireless device; and a linearly polarized reception antenna functionally coupled to a reception subsystem of the wireless device; wherein both antennas are co-located in the wireless device; wherein the transmission antenna and the reception antenna are configured to radiate with linear polarization substantially orthogonal to one another when the wireless device is operating in in-band full-duplex mode. Note that herein, "functionally coupled" means that the components are connected in a fashion so that they function together. For example, a transmission antenna is functionally coupled to its transmission system in a manner that the transmission system send signals through and out from the transmission antenna.

In Example 2: A system as recited in Example 1, wherein the transmission antenna and the reception antenna are configured to radiate with linear polarization in near true orthogonal direction to one another when the wireless device is operating in in-band full-duplex mode.

In Example 3: A system as recited in Example 1, wherein the transmission antenna is selected from a group consisting of slot antenna and dipole antenna.

In Example 4: A system as recited in Example 1, wherein the reception antenna is selected from a group consisting of slot antenna and dipole antenna.

In Example 5: A system as recited in Example 1, wherein the transmission antenna is selected from a group consisting of slot antenna and dipole antenna and the reception antenna is selected from a group consisting of slot antenna and dipole antenna.

In Example 6: A system as recited in Example 5, wherein the slot antenna is selected from a group consisting of a half-wavelength antenna, quarter-wavelength antenna, electrically-small antenna, impedance-loaded antenna, and material-loaded antenna.

In Example 7: A system as recited in Example 5, wherein dipole antenna is a sleeve dipole antenna.

In Example 8: A system as recited in Example 5, wherein the dipole antenna is positioned inside a slot of the slot antenna.

In Example 9: A system as recited in Example 1, wherein the transmission antenna and the reception antenna, when the wireless device is operating in in-band full-duplex mode, exhibit an isolation of at least about 60 dB.

In Example 10: A system as recited in Example 5, wherein: the dipole antenna is positioned inside a slot of the slot antenna; the slot antenna has a coaxial cable slot feed connecting elements of the slot antenna having a multiple layer planar structure; wherein the coaxial cable slot feed is disposed over the slot and the dipole antenna.

In Example 11: A system as recited in Example 5, wherein: the dipole antenna is positioned inside a slot of the slot antenna; wherein the slot antenna is a coaxial cable slot feed connecting elements of the slot antenna; wherein the coaxial cable slot feed is disposed over the slot of the slot antenna and the dipole antenna therein; wherein the coaxial cable slot feed comprises an exposed coax conductor in a portion of the coaxial cable slot feed that is disposed over the slot of the slot antenna and the dipole antenna.

Example 12 is an antenna system comprising: a linearly polarized transmission antenna disposed on a substrate and being functionally coupled to a wireless transmission subsystem of a wireless device; a linearly polarized reception antenna disposed on the substrate and being functionally coupled to a reception subsystem; each antenna being configured to radiate with linear polarization substantially orthogonal of each other when the subsystems operate within a common frequency band simultaneously.

In Example 13: A system as recited in Example 12, wherein the transmission antenna and the reception antenna are configured to radiate with linear polarization in near true orthogonal direction to one another when the subsystems operate within a common frequency band simultaneously.

In Example 14: A system as recited in Example 12, wherein the transmission antenna and the reception antenna are co-located in the wireless device.

In Example 15: A system as recited in Example 12, wherein one of the transmission antenna and the reception antenna is a slot antenna.

In Example 16: A system as recited in Example 12, wherein one of the transmission antenna and the reception antenna is a dipole antenna.

In Example 17: A system as recited in Example 12, wherein one of the transmission antenna and the reception antenna is a sleeve dipole antenna and the other is a slot antenna.

In Example 18: A system as recited in Example 12, wherein: one of the transmission antenna and the reception antenna is a dipole antenna and the other is a slot antenna; the dipole antenna is positioned, at least partially, within a slot of the slot antenna.

In Example 19: A system as recited in Example 18, wherein: the slot antenna as a coaxial cable slot feed that connect elements of the slot antenna; the coaxial cable slot feed bridges over the slot of the slot antenna and the dipole antenna therein; the coaxial cable slot feed has an exposed coax conductor in a portion of the coaxial cable slot feed that bridges over the slot of the slot antenna and the dipole antenna.

In Example 20: A system as recited in Example 19, wherein the exposed coax conductor has a length that is less than a width of the dipole antenna.

In Example 21: A system as recited in Example 12, wherein the transmission antenna and the reception antenna, when the subsystems operate within a common frequency band simultaneously, exhibit an isolation of at least about 60 dB.

Example 22 is a wireless device comprising: a wireless communication system including a wireless transmission subsystem and a reception subsystem, each being configured to operate within a common frequency band and simultaneously; an antenna system including a pair of co-located complementary substantially orthogonal linearly polarized antennas, wherein each of the subsystems is functionally coupled to only one of antennas of the pair.

In Example 23: A device as recited in Example 22, wherein one of the antennas of the pair of antennas of the antenna system is a dipole antenna and the other is a slot antenna.

In Example 24: A device as recited in Example 22, wherein: one of the antennas of the pair of antennas of the antenna system is a dipole antenna and the other is a slot antenna; the dipole antenna is positioned, at least partially, within a slot of the slot antenna.

In Example 25: A device as recited in Example 22, wherein the antennas, when the subsystems operate within a common frequency band simultaneously, exhibit isolation of at least about 60 dB.

What is claimed is:

1. An in-band full-duplex (IBFD) antenna system comprising:
   a linearly polarized transmission antenna functionally coupled to a wireless transmission subsystem of a wireless device; and
   a linearly polarized reception antenna functionally coupled to a reception subsystem of the wireless device, wherein:
   both antennas are co-located in the wireless device;
   the transmission antenna and the reception antenna are configured to radiate with linear polarization substantially orthogonal to one another when the wireless device is operating in in-band full-duplex mode;
   one of the transmission antenna and the reception antenna is a slot antenna having first and second elements, the other one of the transmission antenna and the reception antenna being positioned at least partially within a slot of the slot antenna; and
   the slot antenna includes a feed connecting the first and the second elements of the slot antenna, the feed being disposed over the slot and the other antenna within the slot.

2. A system as recited in claim 1, wherein the transmission antenna and the reception antenna are configured to radiate with linear polarization in near true orthogonal direction to one another when the wireless device is operating in in-band full-duplex mode.

3. A system as recited in claim 1, wherein the other one of the transmission antenna and the reception antenna is a dipole antenna.

4. A system as recited in claim 3, wherein dipole antenna is a sleeve dipole antenna.

5. A system as recited in claim 1, wherein the slot antenna is selected from a group consisting of a half-wavelength antenna, quarter-wavelength antenna, electrically-small antenna, impedance-loaded antenna, and material-loaded antenna.

6. A system as recited in claim 1, wherein the other one of the transmission antenna and the reception dipole antenna is positioned completely inside the slot of the slot antenna.

7. A system as recited in claim 1, wherein the transmission antenna and the reception antenna, when the wireless device is operating in in-band full-duplex mode, exhibit an isolation of at least about 60 dB.

8. The system as recited in claim 1, wherein the feed is a coaxial cable slot feed that connects the first and the second elements of the slot antenna.

9. A system as recited in claim 8, wherein the other one of the transmission antenna and the reception antenna is a dipole antenna.

10. A system as recited in claim 1, wherein:
    the feed is a coaxial cable slot feed that connects the first and the second elements of the slot antenna; and
    the first and the second elements of the slot antenna have a multiple layer planar structure.

11. A system as recited in claim 1, wherein:
    the feed is a coaxial cable slot feed that comprises an exposed coax conductor in a portion of the coaxial cable slot feed that is disposed over the slot of the slot antenna and the other one of the transmission antenna and the reception antenna.

12. An antenna system comprising:
    a linearly polarized transmission antenna disposed on a substrate and being functionally coupled to a wireless transmission subsystem of a wireless device;
    a linearly polarized reception antenna disposed on the substrate and being functionally coupled to a reception subsystem, wherein one of the transmission antenna and the reception antenna is a slot antenna having first and second elements, the other one of the transmission antenna and the reception antenna being positioned at least partially within a slot of the slot antenna; and a feed that connects the first and the second elements of the slot antenna and bridges over the slot and the other antenna therein, wherein each antenna is configured to radiate with linear polarization substantially orthogonal of each other when the subsystems operate within a common frequency band simultaneously.

13. A system as recited in claim 12, wherein the transmission antenna and the reception antenna are co-located in the wireless device.

14. A system as recited in claim 12, wherein:
the other one of the transmission antenna and the reception antenna is a dipole antenna; and
the dipole antenna is positioned completely within the slot of the slot antenna.

15. A system as recited in claim 12, wherein:
the feed is a coaxial cable slot feed that connects the first and the second elements of the slot antenna; and
the coaxial cable slot feed has an exposed coax conductor in a portion of the coaxial cable slot feed that bridges over the slot of the slot antenna and the dipole antenna.

16. A system as recited in claim 15, wherein the exposed coax conductor has a length that is less than a width of the dipole antenna.

17. A system as recited in claim 12, wherein the other one of the transmission antenna and the reception antenna is a dipole antenna.

18. A system as recited in claim 12, wherein the feed is a coaxial cable slot feed that connects the first and the second elements of the slot antenna.

19. A wireless device comprising:
a wireless communication system including a wireless transmission subsystem and a reception subsystem, each being configured to operate within a common frequency band and simultaneously; and
an antenna system including a pair of co-located complementary substantially orthogonal linearly polarized antennas, each of the subsystems being functionally coupled to only one of antennas of the pair, wherein:
one of the pair of antennas is a slot antenna having first and second elements, the other antenna being positioned at least partially within a slot of the slot antenna; and
the slot antenna is feed by a feed that connects the first and the second elements of the slot antenna and bridges over the slot and the other antenna therein.

20. A device as recited in claim 19, wherein the other antenna is a dipole antenna.

21. A device as recited in claim 19, wherein:
the other antenna is a dipole antenna; and
the dipole antenna is positioned completely within the slot of the slot antenna.

22. A device as recited in claim 19, wherein the antennas, when the subsystems operate within a common frequency band simultaneously, exhibit isolation of at least about 60 dB.

23. A device as recited in claim 19, wherein the slot of the slot antenna is disposed between the first and the second elements of the slot antenna.

24. A device as recited in claim 19, wherein the feed is a coaxial cable slot feed that connects the first and the second elements of the slot antenna.

* * * * *